United States Patent
Beshah

[11] Patent Number: 6,079,134
[45] Date of Patent: Jun. 27, 2000

[54] WIRE LOOM

[76] Inventor: Paul T. Beshah, 7719 W. 22nd St., St. Louis Park, Minn. 55426

[21] Appl. No.: 09/076,471

[22] Filed: May 12, 1998

[51] Int. Cl.[7] .............................. G09F 3/00; G09F 3/18; H02G 3/04
[52] U.S. Cl. ..................... 40/316; 40/661.05; 174/95; 254/134.3 FT
[58] Field of Search ............... 40/316, 299.01, 40/660, 661.05; 174/68.3, 95, 112; 254/134.3 FT

[56] References Cited

U.S. PATENT DOCUMENTS

| | | | |
|---|---|---|---|
| 286,948 | 10/1883 | Martin | 174/95 |
| 1,667,824 | 5/1928 | Richey | 174/112 |
| 3,166,810 | 1/1965 | Ensley . | |
| 3,363,879 | 1/1968 | Irik . | |
| 3,861,068 | 1/1975 | Zygmunt | 40/316 |
| 4,128,736 | 12/1978 | Nutt et al. | 40/316 X |
| 4,158,746 | 6/1979 | Taylor et al. | 174/112 |
| 4,432,663 | 2/1984 | Lasak et al. . | |
| 4,460,159 | 7/1984 | Bois et al. . | |
| 5,067,843 | 11/1991 | Nova | 254/134.3 FT X |
| 5,129,027 | 7/1992 | Boero et al. . | |

*Primary Examiner*—Terry Lee Melius
*Assistant Examiner*—Rodrigo J. Morales
*Attorney, Agent, or Firm*—Janet Peyton Schafer

[57] ABSTRACT

A wire loom having a loom body with apertures formed longitudinally there-through, the apertures for receipt of individual electrical-type wires. Adjacent each aperture is a reference symbol identifying the source of connection of the individual wire. Notation and recordation of the source and/or destination of each wire adjacent these reference symbols permit later users to easily identify the source of connection of an individual wire. A wire loom having a loom body of a multi-sided polygon. Color-coding areas of the loom body also aids in identification of wires held by the wire loom. A pair of wire looms is provided to receive individual wires into similarly referenced apertures for ease of identification of individual wires within the pair of looms when the looms are positioned remote from each other.

16 Claims, 5 Drawing Sheets

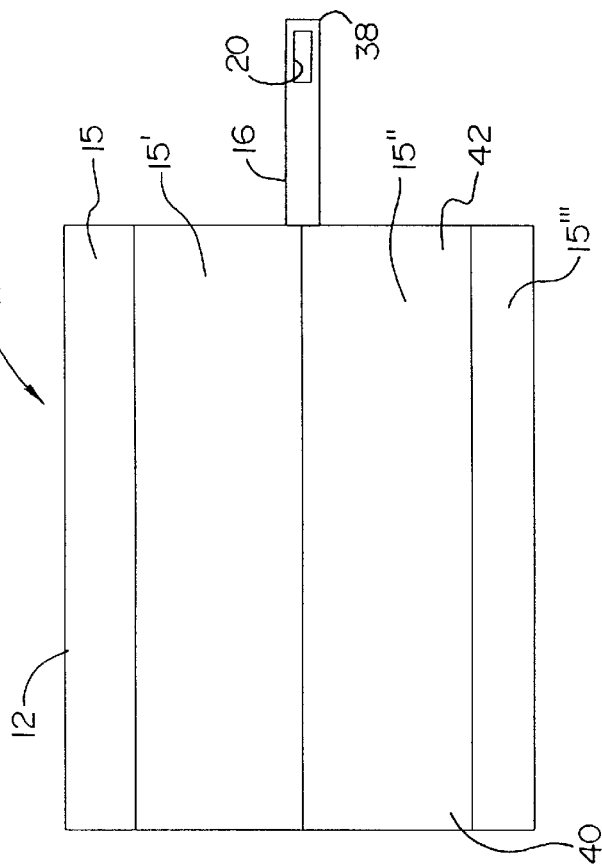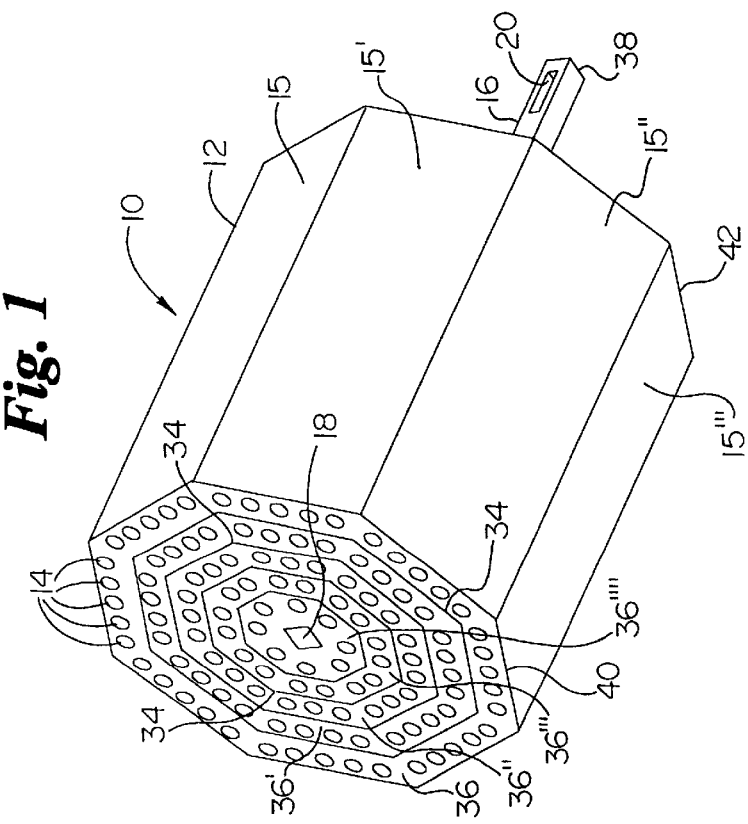

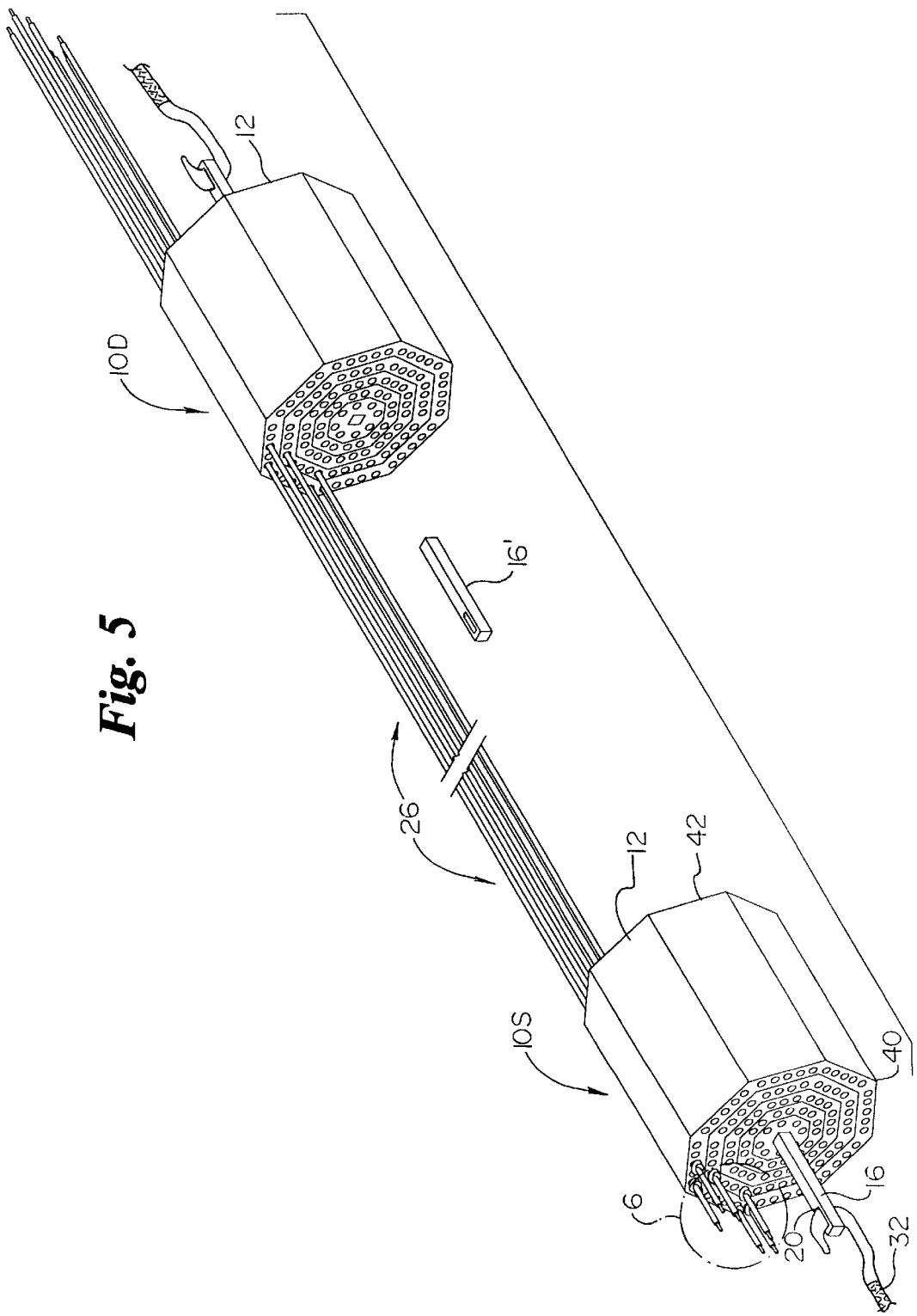

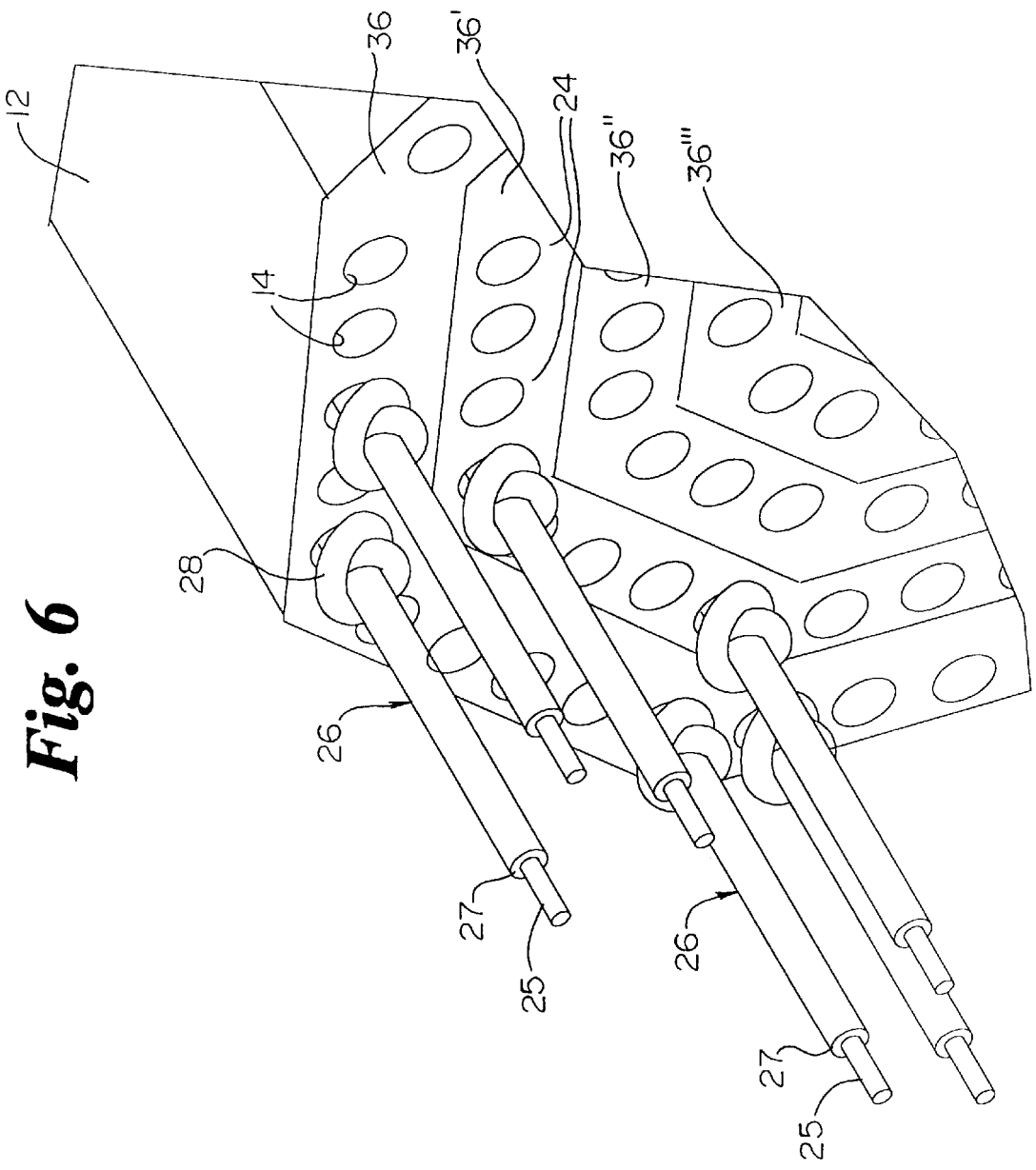

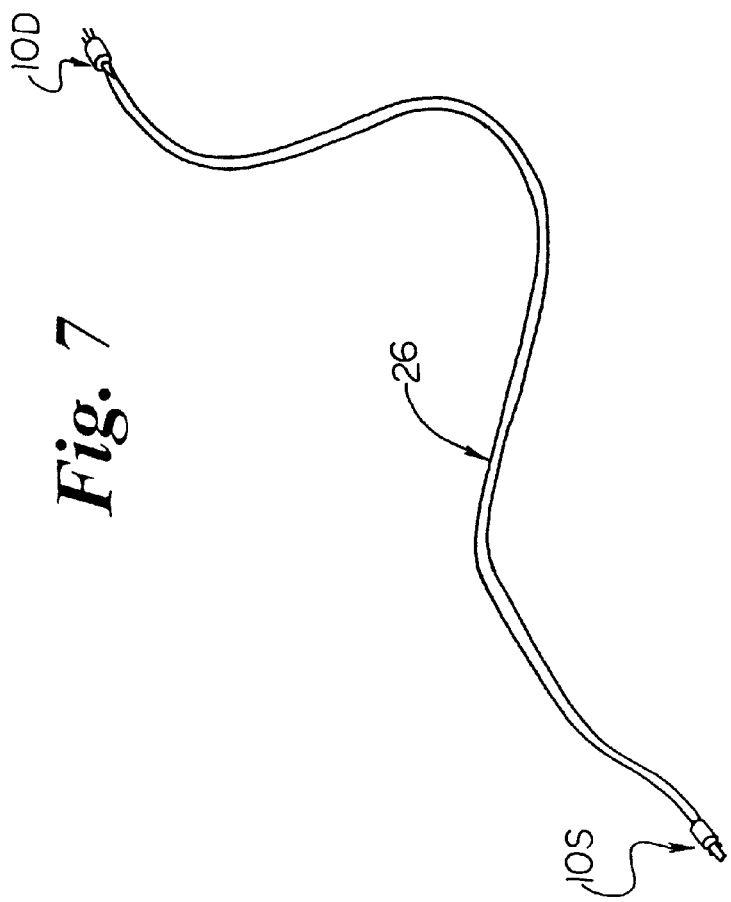
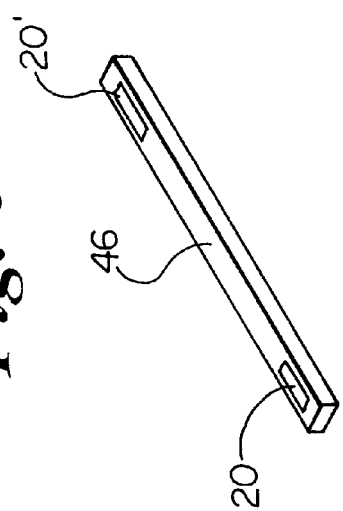

, # WIRE LOOM

BACKGROUND

This invention relates to apparatus and method for threading electrical-type wiring. This invention is particularly directed to apparatus and method for manually threading a group of insulated wires into a loom, the loom retaining and positioning the wires in such a manner that during and after installation, an individual wire may be easily identified as to origin and destination of the wire.

The problem this invention addresses is the time-consuming trial and error procedure currently in use to identify the origin and destination of a wire when grouped with other like wires, telephonic, electrical, cable television wiring or the like.

Cable pulling devices have been provided in prior art that are adapted to include apparatus for attachment to a multi-wire cable. For example, Lasak et al, U.S. Pat. No. 4,432,663, Ensley U.S. Pat. 3,166,810 Irik, U.S. Pat. No. 3,363,879 Charlebois et al, U.S. Pat. No. 4,460,159,and Boreao et al., U.S. Pat. No. 5,129,027, are all illustrative of such prior cable pullers. None of these inventions address the problem of identifying an individual wire within a group of wires. Currently, when electrical wires or telephonic wires are installed, each individual wire must be tested to identify the source of connection. This trial and error method is time consuming and thus costly. The device of the present invention provides apparatus to ease installation by grouping wires together, providing means to identify, at a glance, the original source of connection and the destination for each wire and further to provide means for pulling the group of wires through conduit and the like.

SUMMARY

The present invention is directed to a wire loom that satisfies these needs whereby a group of electrical-type insulated wires may be threaded into, retained in, and positioned for use in such a manner that an individual wire may be easily identified, both during installation and at a later date. The present invention is a wire loom having a loom body with a plurality of apertures oriented longitudinally therein, each aperture for receiving an individual wire. Each wire is secured in position in the aperture by fastening means. Adjacent each aperture is a reference symbol for identification of the wire retained within the aperture.

A first end of a wire, within a group of wires, is threaded through the loom and anchored by fastening means as strain relief to resist pulling the wire out of the wire-loaded loom. Means for attaching a cable puller, for ease in positioning a loaded wire-loom, are also provided.

An axial passage, having a square-shape or other non-round shape, is formed in the loom body. A projection key, having a cross-section shaped for receipt by the axial passage, having an eye member formed in one end, provides a point of attachment for a cable puller.

A pair of wire looms may be provided and aligned relative to each other such that the reference symbols of the second loom are positioned immediately adjacent similar reference symbols of the first loom. The individual wires are loaded by manually threading the individual wires into the pair of looms, either simultaneously or serially, and the pair of looms may then be positioned apart from each other. A cable or rope attached to a drawing hook is used to temporarily attach to an eye member formed in an end of projection key mounted on an end of loom. The cable is then used to pull the one or both pair of wire looms, with the individual wires following, into position for use.

A second embodiment projection key member has a second eye member, formed in an opposite end, for receipt of key fastening means, such as a pin, clip or the like, to retain the projection key within loom body when loom is pulled by cable pulling means.

Loom body may be a multi-sided polygon, each side colored differently, so that identification of an individual wire held by the loom body, is aided. Additionally, color coding the loom body permits ease of alignment of a pair of like-colored looms. An additional embodiment provides a loom body having cross-sectional layers of different colors.

An advantage of the present invention is that it provides novel means of quickly identifying the origin and/or destination of an individual wire within a group of wires, by comparing the reference number adjacent each aperture within the loom with a log, made during installation of the group of wires, identifying each individual wire by reference symbol.

It is a further advantage of the present invention to provide a pair of looms which, when aligned and temporarily interconnected, provide means to identify an individual wire within a group of wires.

It is a further advantage of the present invention to provide means for pulling a loaded wire loom, by cable pulling means into position for use.

BRIEF DESCRIPTION OF THE DRAWINGS

Understanding of the invention will be enhanced by referring to the accompanying drawings, in which like numbers refer to like parts in the several views and in which:

FIG. 1 is a perspective view of the wire loom;

FIG. 2 is a side view of the wire loom;

FIG. 5 is a perspective view of a pair of wire looms in position relative to each other with individual wires threaded therethrough;

FIG. 6 is an enlarged view of the fragment indicated in FIG. 5;

FIG. 7 is a perspective view of a pair of wire looms in position for use remote from each other; and FIG. 8 is a perspective view of a second embodiment key member having a pair of eye members formed therein.

DETAILED DESCRIPTION OF THE CURRENTLY PREFERRED EMBODIMENTS

Figure 4:
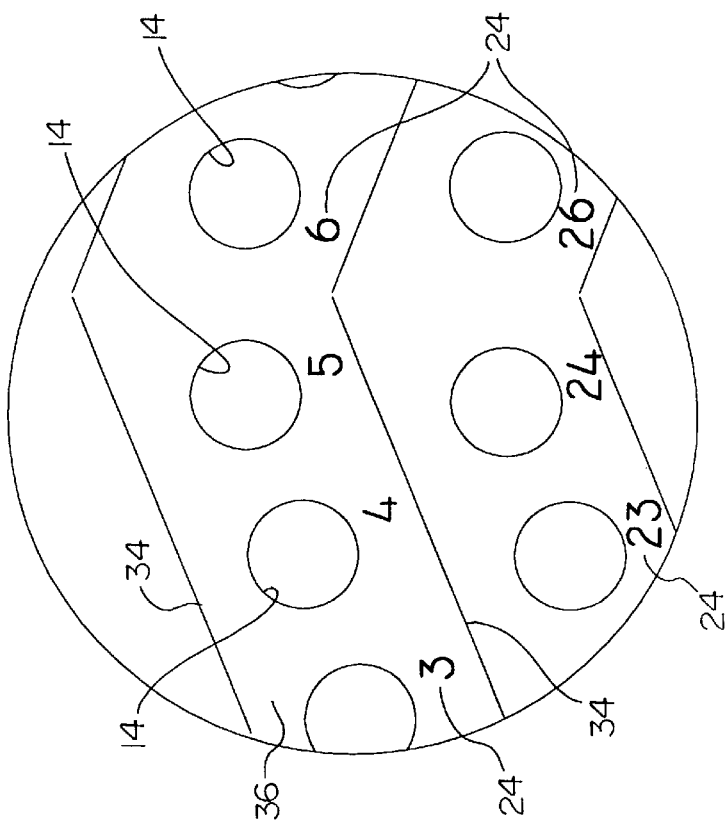
FIG. 4 is an enlarged view of the fragment indicated in FIG. 3.

Understanding of the invention will be further enhanced by referring to the following illustrative but non-limiting example.

Turning now to the drawings, in which like reference characters refer to corresponding elements throughout the several views, FIG. 1 illustrates a wire loom 10 having a loom body 12 with a series of apertures 14 formed longitudinally along the length thereof. Each loom aperture 14 receives an individual wire 26, be it electrical, telephonic, or otherwise. Each loom aperture 14 has an adjacent reference symbol 24, shown at FIG. 6, to identify the loom aperture 14. By noting the source of connection of an individual wire and the associated reference symbol as the loom 10is loaded with wires 26, shown at FIGS. 5 & 6, a user at a later date may easily identify an individual wire 26 within the group held by the loom 10. Additionally, a pair of wire looms can be placed adjacent each other such that the apertures 14 in each are aligned so that similar reference symbols are adjacent each other allowing the individual wire to be threaded through both wire looms 10D & 10S shown at FIG. 5, with a single reference symbol associated with each individual wire 26. The pair of looms 10D & 10S can be temporarily locked in this aligned position, permitting simultaneous loading of the wires into the pair of looms. Each wire 26 is fastened at a first end to prevent pulling out in response to strain put on the wire. Where a pair of looms 10D & 10S are used, after loading the pair of looms 10D & 10S with wires 26, the pair of looms 10D & 10S are put into position apart from each other, FIG. 5. By making note of the reference symbol adjacent the aperture 14 in the loom 10 during loading of the wire 26 into the loom 10, later reference to the log or other list of reference symbols, identifies the individual wire 26. The reference symbol 24 associated with the aperture 14, through which an individual wire 26 is threaded, is the same on both looms 10D & 10S.

FIG. 1 illustrates the wire loom 10 of the present invention. The wire loom 10 has a loom body 12 with apertures 14 formed longitudinally there-through. In the preferred embodiment, the loom body 12 is a multi-sided polygon, although other shapes including triangular and a circular could also be used. The loom body 12 is formed of a hard plastic although other materials, such as ceramics, wood or other plastics could also be used.

Figure 3:
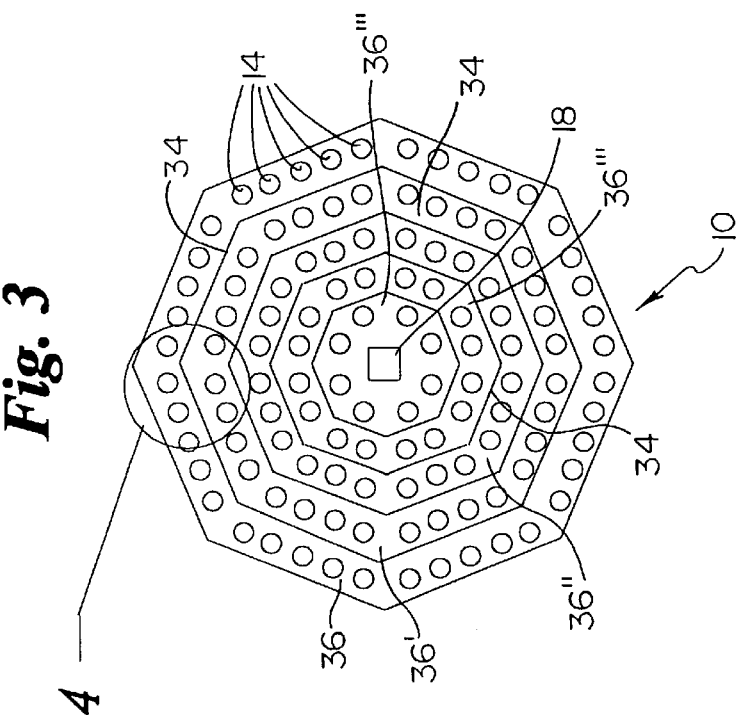
FIG. 3 is an end view.

The sides 15,15', 15", 15"'", etc. of the multi-sided polygon of loom body 12 may be color-coded to more quickly align a pair of looms 10D & 10S, shown in FIG. 5, and also to more quickly identify a wired held by either loom 10D or 10S. Loom body 12 can additionally be of color-coded cross-sectional layers 36,36', 36", 36"'" etc., defined by ridges 34 or indentations within an end 40,42 of loom 10, as shown at FIGS. 1, 3, & 6. Also, apertures 14 may be positioned in regions within loom body 12, such as the triangular shape, indicated by phantom lines at FIG. 3, surrounding a group of apertures 14 formed in a first end 40 of loom body 12, shown at FIGS. 1 & 3. The color-coding of sides 15,15', 15", etc. and/ or layers aids in the identification of an individual wire 26 retained in wire loom 10.

Each loom aperture 14 has associated therewith a reference symbol 24, FIG. 4, such as a number and/or letter, stamped, adhered onto or affixed by other means, on both first end 40 and second end 42. Recording the origin or source of the connection of each individual wire 26 and retention of that record either onto a log, a blue print, a sticker affixed to the side of the loom body or by other recording means, identifies the wire 26 in the aperture 14without the need for trial and error testing of the individual wires to determine the source of connection of the wire.

In the preferred embodiment, a square-shaped axial passage 18is formed centrally in loom body 12, although other shapes other than round could also be used, e.g. triangular or a multi-sided polygon. The apertures 14 are oriented longitudinally in loom body 12B from first end 40 to second end 42 and parallel to axial passage 18.

In the preferred embodiment, a rectangular-shaped projection key 16, with a square-shaped cross-section is provided, although any shape other than round could be used. Projection key 16 is received by axial passage 18. Because both axial passage 18 and projection key 16 are of a shape other than round, rotation of projection key 16 within axial passage 18 and rotation of associated wire looms 10D & 10S, is prevented. Insertion of projection key 16 into axial passage 18 can be used to interconnect a pair of wire looms 10D & 10S, shown at FIG. 5. Because both the axial passage 18 and the cross-section of projection key 16 are a shape other than round, the pair of looms 10D & 10S do not rotate relative to each other but rather are locked into place adjacent each other.

Projection key 16 has an eye member 20, in the preferred embodiment a rectangular shaped eye member 20 is used, although other shapes could be used, formed in the distal end 38 thereof, FIG. 2. Eye member 20 provides a point of attachment by which pulling means, such as drawing hook 30 with drawing cable 32 attached thereto, shown at FIG. 5, may be used to pull the wire-loaded loom into position within a conduit, or other location.

In use, a wire loom 10 according to the above description is provided and loaded manually with wires 26, noting the reference symbol related to the source and/or destination of the individual wire. This noting of reference symbols could be in the form of a log or index or other manner, not shown. After loading wire 26 into a first wire loom 10, a first end of wire 26 is fastened, by knotting, as shown in FIG. 6, or by other fastening means. A projection key 16 is then manually inserted into wire loom 10 and retained there by fastening means. Projection key 16 is manually placed in position, received by axial passage 18, such that eye member 20 projects outwardly providing a point of attachment for cable pulling means 30 & 32.

Second embodiment projection key 46, FIG. 8, has an eye member 20 at both ends thereof, projection key 46 of a length greater than the length of loom body 12, providing a first eye member extending beyond the first end 40 of loom body 12, for receiving a pin or other fastening means, to retain projection key 46 within loom body 12 when received by axial passage 18. Projection key 46 is received by axial passage 18 by manually inserting projection key 46 therein. When projection key 46 is in position, a second eye member 20' extends from a second end 42 of loom body 12 and provides a point of attachment for cable pulling means 30 & 32 to pull the loaded wire loom 10 into position.

A second embodiment wire loom provides a pair of wire looms 10D & 10S. The pair of wire looms 10D & 10S are positioned side by side with the reference symbols 24 of each in alignment relative to each other. Where color-coded sides 15 of wire loom are used, aligning like-colored sides next to each other easily provides identical reference symbols in similar position in both of the pair of looms. Either projection key 16, or projection key 46 may be used to temporarily interconnect a pair of wire looms 10D & 10S by being received by the axial passage 18 of both wire looms 10D & 10S and retained there by fastening means. Projection key 16, or 46 temporarily locks the pair of looms 10D & 10S into position relative to each other by preventing rotation of either of the pair of looms 10D & 10S because of the cross-sectional shape of projection key 16, or 46. The pair of wire looms 10D & 10S may be loaded simultaneously with individual wires 26, noting the reference symbol 24 related to the source and/or destination of the individual wire. This noting of reference symbols 24 could be in the form of a log or index or other manner. A first end of wire 26 is fastened, by knotting or other fastening means at a first end of first wire loom 10D.

The pair of looms 10D & 10S are then positioned apart from each other, FIG. 7, by cable pulling means or other means temporarily attached to at least one wire loom 10D & 10S, permitting identification of individual wires within the group of wires held by said pair of looms by comparison of the reference symbol 24 adjacent the wire 26 in question with the log or index of the wires loaded into the loom.

Additionally, wire looms 10D & 10S may be loaded serially, in which case looms 10D & 10S do not have to be locked into aligned position with each other, however, care must be taken to load the individual wires 26 into apertures 14 of each loom 10D & 10S having the identical reference symbol 26 associated therewith. Where color-coded sides 15 of wire loom 10 are used, aligning like-colored sides 15 next to each other easily provides identical reference symbols 24 in similar position in both of the pair of looms 10D & 10S.

In use with either a single wire loom 10 or a pair of wire looms 10D & 10S, wire 26 may be cut into lengths prior to being threaded into wire loom 10 or a first end of each wire 26 may be threaded through wire loom 10 from a coil of wire retained on a spindle, not shown, the spindle unrolling the wire 26 as needed.

Although the present invention has been described in considerable detail with reference to certain preferred versions thereof, other versions are possible. For example, an insulated wire loom could be used. In another example, wire loom could be formed in a relatively flat, two-piece clamshell arrangement which, in addition, could be hinged. Also, projection key could be formed as part of loom body. Therefore, the spirit and scope of the appended claims should not be limited to the description of the preferred versions contained herein.

What is claimed is:

1. A wire loom, for holding fast lengths of individual wires within a group of wires, comprising:
   a) a loom body, having an outer surface and having a first end and a second, opposite, end;
   b) a series of apertures, formed longitudinally within said loom body, each aperture for receiving an individual wire;
   c) a reference symbol adjacent each aperture, for identifying the individual wire within a group of wires retained within said loom body; and
   d) an axial passage, formed longitudinally and oriented centrally within said loom body, said axial passage has a cross-sectional square-shape.

2. The wire loom of claim 1, further comprising a projection key member, a first end of which is shaped to be received by said axial passage but resisting rotation of said projection key member relative to said axial passage.

3. The wire loom of claim 2, further comprising projection key fastening means for releasably attaching said projection key member in said axial passage.

4. The wire loom of claim 3, wherein said projection key member further comprises an eye member formed in a second end thereof as cable receiving means.

5. The wire loom of claim 4, further comprising a second eye member, formed in said first end of said projection key member, said second eye member for receipt of said projection key fastening means.

6. The wire loom of claim 1, wherein said loom body is further comprised of a multi-sided polygon.

7. The wire loom of claim 6, wherein said loom body is color coded such that each side is a different color.

8. The wire loom of claim 6, wherein said loom body is comprised of layers of different colored materials.

9. The wire loom of claim 1 further comprising a second wire loom, said pair of wire looms aligned and positioned relative to each other such that similar reference symbols of each wire loom are adjacent each other, whereby an individual wire may be received by and manually threaded through an aperture of each loom having a similar reference symbol such that when said pair of wire looms are positioned apart from each other, a single wire held by said pair of wire looms is identified by a single reference symbol such that reference to a legend identifies the single wire.

10. The wire loom of claim 9, further comprising a projection key member shaped to be received by said axial passage of each loom body.

11. The wire loom of claim 10, wherein said projection key member temporarily interconnects said pair of aligned wire looms such that the individual wire may be received by apertures of said pair of wire looms from a first end of said first wire loom to a second end of said second wire loom therein simultaneously.

12. The wire loom of claim 10, wherein each loom body is further comprised of a multi-sided polygon.

13. The wire loom of claim 12, wherein each loom body is color coded such that each side is a different color.

14. The wire loom of claim 12, wherein each loom body is comprised of layers of different colored materials.

15. A method of identifying a wire, having a first end and a second end, within a group of wires within a wire loom of claim 1, whereupon installation, the first end is remote from the second end, comprising the steps of:
   a) providing the wire loom;
   b) threading an individual wire through a loom aperture, from a first end of loom body to a second end of loom body;
   c) providing strain relief at a first end of wire protruding from said first end of loom body; and
   d) noting into an index the reference symbol adjacent the loom aperture and relating to the wire loaded within said loom body.

16. The method of claim 15, further comprising the steps of:
   (a) providing a pair of wire looms;
   (b) aligning said pair of wire looms in position with each other such that identical reference symbols adjacent each aperture, for identifying the individual wire within a group of wires retained within said loom body, of both of said pair of wire looms are adjacent each other;
   (c) threading a wire through loom aperture from a first end of first loom to a second end of second loom;
   (d) providing stress relief on the wire at first end of first loom;
   (e) threading a series of wires through individual loom apertures from a first end of first loom to a second end of second loom;
   (f) noting and recording the reference symbol adjacent each wire loaded into said pair of looms;
   (g) positioning the second of said pair of looms remote from a first loom; and
   (h) identifying, by comparison of the reference symbol record, an individual wire within a group of wires threaded through said pair of looms.

* * * * *